J. R. COOK.
ELECTRIC MOTOR CASING.
APPLICATION FILED SEPT. 13, 1917.
1,325,232.
Patented Dec. 16, 1919.
2 SHEETS—SHEET 1.
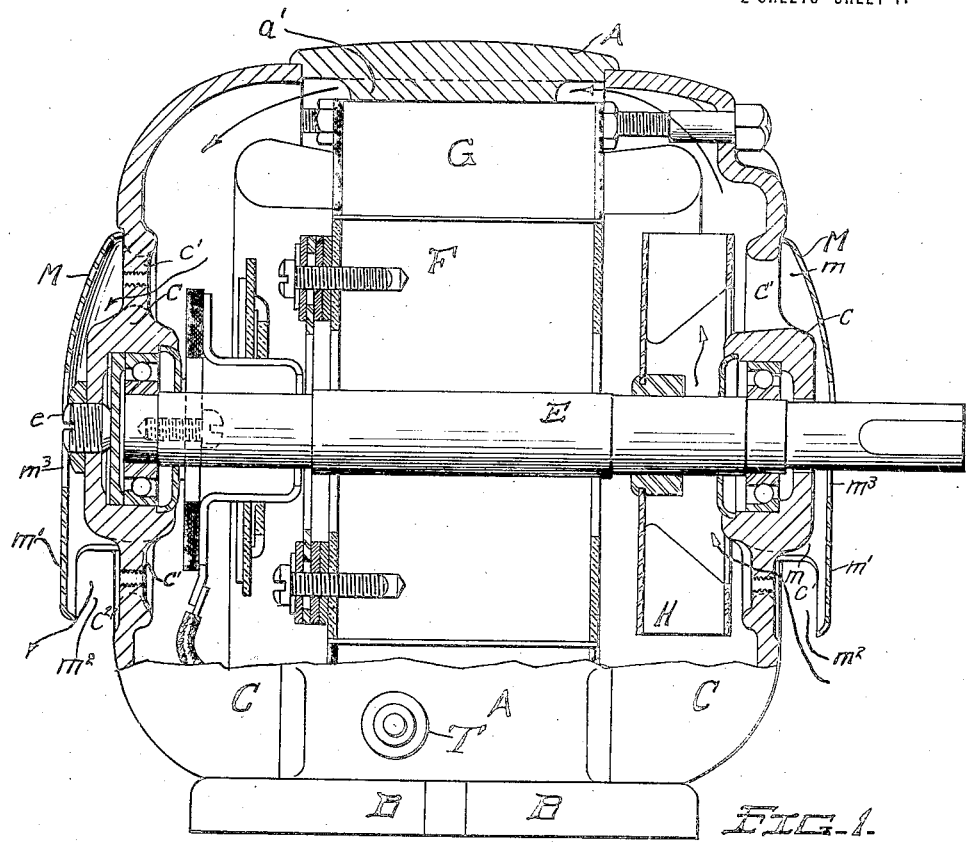
FIG. 1.
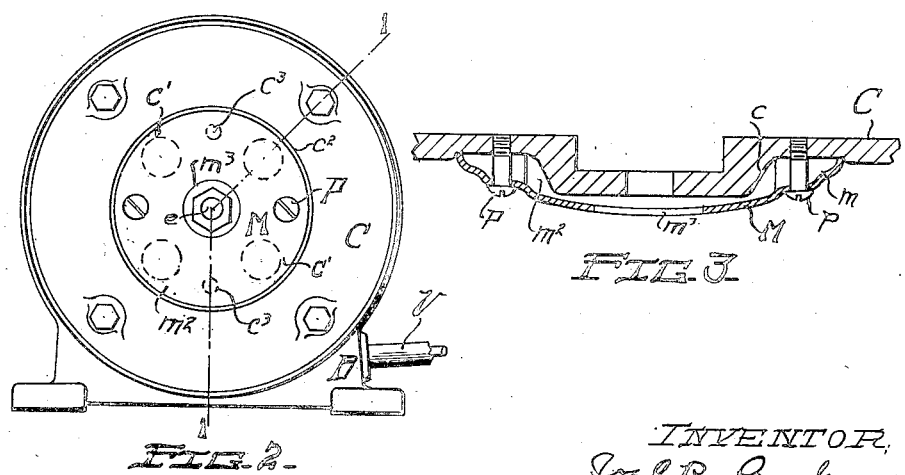
FIG. 2.
FIG. 3.
INVENTOR,
Joel R. Cook
BY Baker & Macklin,
ATTYS J. R. COOK.
ELECTRIC MOTOR CASING.
APPLICATION FILED SEPT. 13, 1917.
1,325,232.
Patented Dec. 16, 1919.
2 SHEETS—SHEET 2.
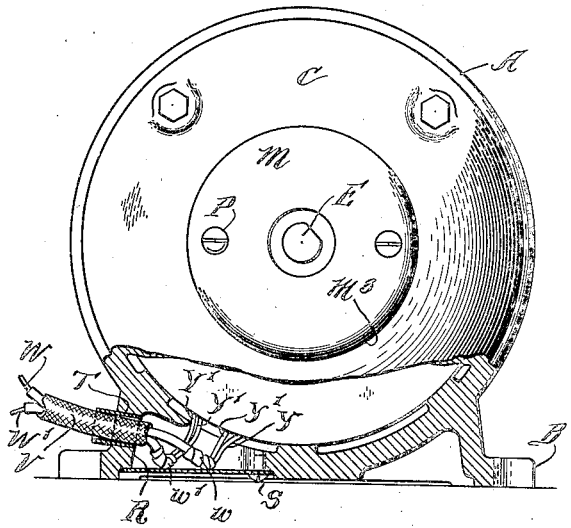
Fig. 4
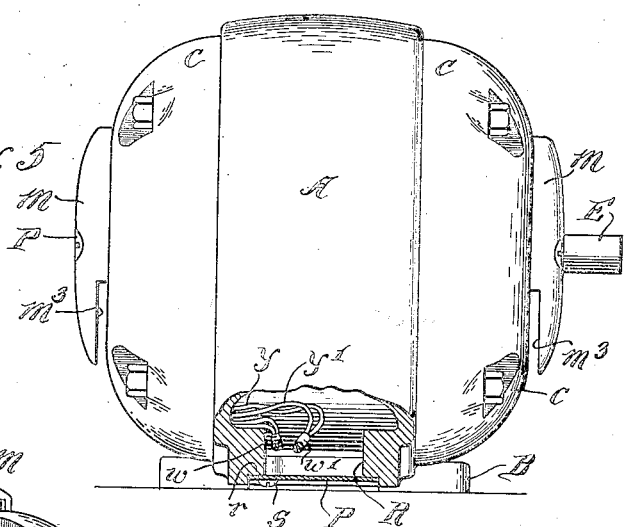
Fig. 5
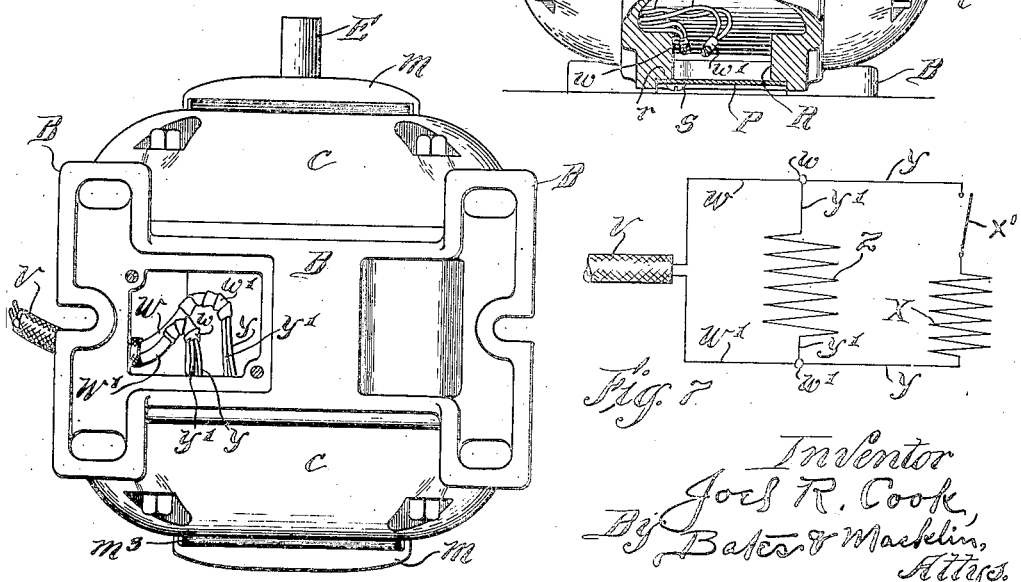
Fig. 6
Fig. 7
Inventor
Joel R. Cook,
By Bates & Macklin,
Attys.

UNITED STATES PATENT OFFICE.

JOEL R. COOK, OF CLEVELAND, OHIO, ASSIGNOR TO THE DOMESTIC ELECTRIC COMPANY, OF CLEVELAND, OHIO, A CORPORATION OF OHIO.

ELECTRIC-MOTOR CASING.

1,325,232.      Specification of Letters Patent.      Patented Dec. 16, 1919.

Application filed September 13, 1917. Serial No. 191,257.

*To all whom it may concern:*

Be it known that I, JOEL R. COOK, a citizen of the United States, residing at Cleveland, in the county of Cuyahoga and State of Ohio, have invented a certain new and useful Improvement in Electric-Motor Casings, of which the following is a full, clear, and exact description, reference being had to the accompanying drawings.

An object of this invention is to provide very simple and effective means for protecting electric motors from being injured or short circuited by water, while at the same time allowing the free circulation of air through the motor to ventilate it. Such devices are of particular importance where an electric motor is used for operating a washing machine or in any other employment where it is liable to be splashed with water.

My invention provides a casing for the motor which is simple in construction, prevents injury from splashing and at the same time allows full ventilation. Another characteristic of my anti-splash casing is that it may be readily adjusted for different positions of the motor, that is, whether the motor stand above its base, or be suspended, or be supported at the side of a wall or post.

Another object is to eliminate exterior binding posts and exposed terminals, by bringing the current supply cable into a water-tight compartment where the cable wires are connected with the wires for the filed and armature windings. A further object is to render this compartment readily accessible for changing such connections to reverse the motor.

This invention is hereinafter more fully explained and its essential characteristics set out in the claims.

In the drawings, Figure 1 is a sectional side of a motor equipped with my anti-splash device at each end thereof, the right hand upper portion of the section being on a plane at an angle to the rest of the section, as indicated by the line 1—1 on Fig. 2. Fig. 2 is an end view of the motor on a reduced scale. Fig. 3 is a horizontal section through one of the end frames of the motor and through the splash guard carried thereby; Fig. 4 is an end elevation of the motor partly in section showing the compartment for the wire connections; Fig. 5 is a side elevation of the motor also sectioned to show said compartment; Fig. 6 is a bottom plan of the motor showing this compartment open; Fig. 7 is a diagram illustrating the connections of the field and armature windings to the cable.

As shown in the drawings, A indicates the central portion of the motor frame provided with a base or supporting feet B, and C and C indicate cup-like end frames which are rigidly secured to the central part. E designates the rotor shaft, which is mounted in bearings carried within bosses $c$ of the end members. F designates a suitable rotor on the shaft and G a stator surrounding the same and carried by the central frame member A. H indicates a fan rigid on the rotor shaft and located between the rotor and the adjacent end frame C. This fan is adapted to draw air through openings $c'$ about the frame boss $c$ and force it through the rotor, the air discharging through the openings $c'$ of the other end member C, as indicated by the arrows in Fig. 1.

In motors of the type described, the forced ventilation is of importance. However, it has been difficult to obtain this without such openings into the motor casing as would render the motor liable to be injured by the splashing. To prevent access of liquid to the interior from splashing, and at the same time allowing ventilation, I have provided the peculiar splash guards of this invention, which will now be described.

The splash guards consist of saucer-shaped members as M secured to the outer face of the end member C of the frame and covering the air openings $c'$ but standing at some distance outside of them and leaving a suitable space into the interior of the guard to allow the passage of air. My guard may be the same whether surrounding the rotor shaft E or mounted on the other end of the motor, and is so shown herein.

In the end wall C of the motor frame there is formed about the boss $c$ which carries the bearing, a shallow circular recess $c^2$, and the ventilating opening or openings $c'$ pass through the end frame at this portion of the wall. The splash guard M has its rim portion $m$ circular and adapted to seat within the recess $c^2$ and make a snug engagement therewith for all except the lower portion of the guard. At such point the rim is cut away as shown at $m^2$ to allow the passage of air. At this portion the body of the guard is continued flat instead of being curved, so as not to restrict the air openings. This flattened portion is indicated at $m'$ in Fig. 1.

The splash guard has a central opening $m^3$ which may surround the rotor shaft E or allow access to the thrust bearing $e$ at the other end. The guard may be held in place on the casing by suitable screws P passing through the guard into the wall of the casing.

When such guards, as described, are mounted on the two ends of the casing, as shown in Fig. 1, they entirely protect the interior from water falling or splashing onto the casing. The metal cup M closely abuts the casing wall at the top of the cup and side portions. The opening $m^3$ through the center of the cup does no harm, for water passing through it simply drops out through the opening $m^2$. The stator G is supported on inwardly projecting ribs $a'$ integral with the central frame member A. This leaves a series of transverse openings surrounding the stator. Thus currents of air may pass into the casing through the opening $m^2$ at one end of the motor and out of the casing through the opening $m^2$ at the other end of the motor. This continued circulation of air is maintained and at the same time the interior of the motor is protected from any splashing or falling water.

Sometimes motors of the type shown in Fig. 1 are suspended on the under side of a support, the motor of that figure being thus inverted. When this is done, it is only necessary to remove the screws P and invert the splash guards. The holes occupied by the guards are diametrically opposite so that this change may be readily made.

Sometimes the motor is mounted to the side of a vertical support as a post or wall. In this case the splash guards are removed and given a quarter turn, the screws P then passing into supplemental holes $c^3$ in that end of the motor frame.

It will be seen from the above that the air openings $m^2$ of my splash guards may face either the base of the motor or the top of it or either side, and thus may come below the rotor shaft however the motor is mounted. In this manner I entirely protect the interior of the motor from access of liquid and at the same time allow the desired ventilation.

Water splashing over exposed binding posts frequently causes short circuits, accordingly to avoid this and still permit changing the connections I form a recess R in the member A opening toward the base and adapted to be closed by a plate P. This plate seats tightly onto a shoulder $r$ and is secured by screws S.

At T is formed an opening leading from the side of the motor frame into the recess and fitted with a collar of insulating material and adapted to closely fit the exterior of the usual cable V. This cable carries wires W and W' which are separated within the recess and then detachably connected at $w$ and $w'$ respectively with wires leading to the starting coil $x$ and main winding coil $z$. These joints are preferably covered by tape as indicated in Figs. 4 and 5. Y and Y' designate the usual wires leading to and from the cable through the windings. At $x'$ is an indicated switch which may control the starting coil and which in practice is usually automatically governed by the speed of the rotor.

It will be seen that the plate P may be readily removed and the wires Y and Y' given any arrangement of connections desired, and that when the plate is in position no connections are exposed, and that the exterior of the motor is free from unsightly binding posts and thus may have a very neat and artistic appearance.

Having thus described my invention, what I claim is:

1. The combination with a motor, having an intermediate frame portion, with a base, and end caps on opposite sides of said intermediate portion and secured to it, of splash guards located at the two ends of the motor, each consisting of a dish shaped member having an edge flange adapted to tightly engage the end wall and motor above and at the sides of the motor axis, a portion of the flange of each splash guard being removed below the motor axis for the passage of air, and means for securing said splash guards in place with the air opening downward, irrespective of whether the supporting base of the motor is below the rotor shaft or above it or at the side of it.

2. The combination with a motor, the frame of which has a circular substantially dome shaped end with a flattened annular portion about a central hub, there being a ventilating opening through such flattened portion outside of the hub, and a dish shaped splash guard materially smaller than the dome shaped end of the frame, said splash guard having a body portion and a rim, means for holding the rim tightly against the flattened end portion of the motor frame outside of the opening through it, the motor end member being provided with a shoulder against which the edge of said rim seats, a portion of said rim being removed to enable air access to the opening through the end member.

3. The combination, with a motor casing having a ventilating opening in its end wall, of a splash guard comprising a dish-shaped member having an approximately flat body portion, a rim curved from the body portion and terminating in a circle, a portion of the rim being removed, the motor casing having a circular recess in which the edge of the splash guard may seat, and means housed within the splash guard rim for holding the splash guard tightly against the motor casing.

4. The combination, with a motor casing having a ventilating opening in its end wall, of a splash guard comprising a dish-shaped member having an approximately flat body portion, a rim curved from the body portion and terminating in a circle, a portion of the rim being removed, the motor casing having a circular recess in which the edge of the splash guard may seat, and screws adapted to pass through the splash guard into the motor casing, there being a plurality of sets of openings for said screws in the motor casing whereby the splash guards may be held in various positions with reference to the motor casing.

5. In a motor, the combination of a frame, stator and rotor windings, wires leading thereto, a recess in the base of the frame, a service cable leading into said recess and having its service wires connected with the stator and rotor winding wires within said recess, and a removable plate inclosing said recess.

In testimony whereof, I hereunto affix my signature.

JOEL R. COOK.